(12) United States Patent
Anguenot

(10) Patent No.: US 8,751,585 B2
(45) Date of Patent: Jun. 10, 2014

(54) ELECTRONIC MESSAGE HANDLING METHOD BASED ON A MESSAGE SYSTEM CLIENT AND SYSTEM TO IMPLEMENT THE METHOD

(75) Inventor: Olivier Anguenot, Plobsham (FR)

(73) Assignee: Alcatel Lucent, Paris (FR)

( * ) Notice: Subject to any disclaimer, the term of this patent is extended or adjusted under 35 U.S.C. 154(b) by 0 days.

(21) Appl. No.: 12/415,089

(22) Filed: Mar. 31, 2009

(65) Prior Publication Data

US 2009/0300124 A1 Dec. 3, 2009

(30) Foreign Application Priority Data

Apr. 4, 2008 (FR) ...................................... 08 52241

(51) Int. Cl.
*G06F 15/16* (2006.01)
*G06Q 10/10* (2012.01)
*H04L 12/58* (2006.01)
*H04L 29/02* (2006.01)
*H04L 29/08* (2006.01)
*H04M 3/53* (2006.01)
*H04M 3/533* (2006.01)

(52) U.S. Cl.
CPC ............ *G06Q 10/107* (2013.01); *H04L 51/26* (2013.01); *H04L 51/12* (2013.01); *H04L 51/14* (2013.01); *H04L 51/24* (2013.01); *H04L 51/36* (2013.01); *H04L 29/02* (2013.01); *H04L 67/22* (2013.01); *H04L 67/2819* (2013.01); *H04L 67/306* (2013.01); *H04L 69/322* (2013.01); *H04M 3/53* (2013.01); *H04M 3/5307* (2013.01); *H04M 3/5335* (2013.01); *H04M 3/53358* (2013.01); *Y10S 707/99951* (2013.01)

USPC .......... 709/206; 718/100; 707/204; 707/668; 707/999.2; 709/218; 709/224; 358/1.15

(58) Field of Classification Search
USPC ................. 709/206, 218; 718/100; 707/999.2
See application file for complete search history.

(56) References Cited

U.S. PATENT DOCUMENTS

| 5,890,163 A | * | 3/1999 | Todd ..................................... 1/1 |
| 5,917,489 A | | 6/1999 | Thurlow et al. |
| 7,730,148 B1 | * | 6/2010 | Mace et al. .................... 709/206 |
| 2003/0105827 A1 | * | 6/2003 | Tan et al. ...................... 709/206 |

(Continued)

OTHER PUBLICATIONS

Stephen Pollock, "A Rule-Based Message Filtering System," ACM Transactions on Office Information Systems, XX, XX, vol. 6, No. 3, pp. 232-254, XP000564860, Jul. 1, 1988.
French Search Report.

*Primary Examiner* — Kyung H Shin
(74) *Attorney, Agent, or Firm* — Fay Sharpe LLP

(57) ABSTRACT

The invention concerns a management method applying to electronic messages in an inbox associated to a user (3) of an electronic message client integrated in a communication system (1). According to the invention, for each of the said electronic messages, the user (3) may, from within the electronic message client (2), assign an archiving rule consisting in the definition, on the one hand, of at least one action out of a list of actions whose implementation is susceptible of being detected by the said communication system (1), and, on the other hand, of information concerning a location (115, 215) within the said communication system (1) to which the said message is to be moved when the said action is carried out. The said message is actually moved to the said location (115, 215) upon detection by the said communication system (1) of implementation of the action.

20 Claims, 1 Drawing Sheet

(56) References Cited

U.S. PATENT DOCUMENTS

| | | | |
|---|---|---|---|
| 2005/0204001 A1* | 9/2005 | Stein et al. | 709/206 |
| 2006/0072144 A1* | 4/2006 | Dowling et al. | 358/1.15 |
| 2007/0157203 A1* | 7/2007 | Lim | 718/100 |
| 2008/0250084 A1* | 10/2008 | Polimeni | 707/204 |

* cited by examiner

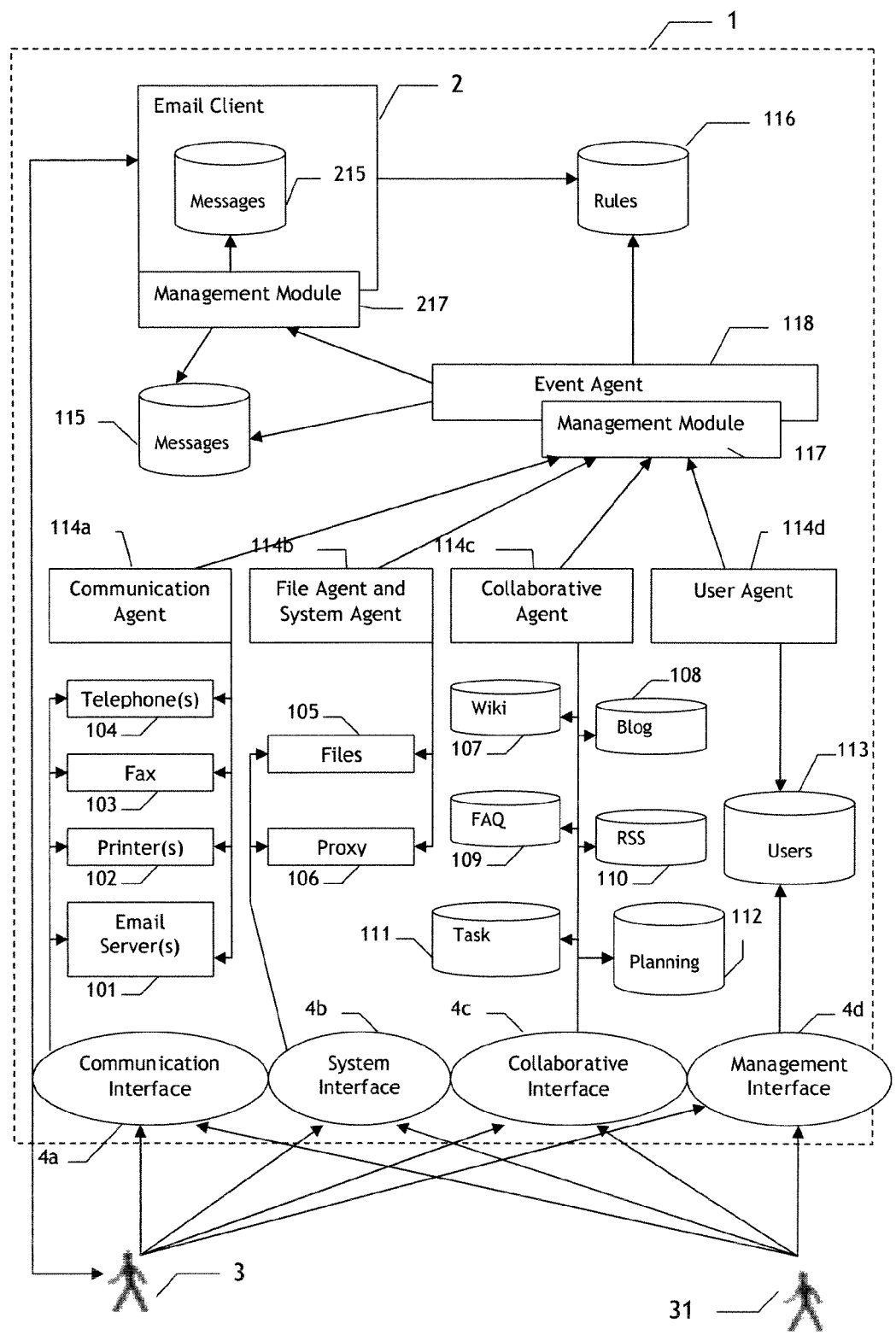

ELECTRONIC MESSAGE HANDLING METHOD BASED ON A MESSAGE SYSTEM CLIENT AND SYSTEM TO IMPLEMENT THE METHOD

The present invention relates to the domain of electronic mail messaging systems, in particular to a method for handling electronic messages in the inbox of a user of a mail system client, and to a special system for the implementation of the said method.

While initially electronic mail was intended to be used for the exchange of professional messages within a corporate network, it is today also used not only for personal purposes but also to carry all kinds of advertisements. As the subjects and sources of the messages can be of all kinds, filtering tools were naturally also developed.

A first category of filtering tools acts directly on the messaging system server, with such tools being primarily designed automatically to delete messages considered to be undesirable.

A second category of filtering tools is associated to the use of a mail client such as Outlook® or Kmail. These tools enable a user, when downloading messages from an electronic message server by means of the electronic message client, to sort the messages to facilitate reading the messages received and viewed on the electronic message client. Filtering is based, in particular, on an analysis of the messages' "Subject" and "Source" fields. Thus, as soon as they are downloaded by the electronic message client, messages can be diverted into a special folder of the electronic message client based on selection criteria previously created by the user.

However, when a selection rule is defined by a user from within his/her electronic message client, it will apply to all future messages the user will receive, without the user being able to take the content of the message into consideration. For this reason, these selection tools are often only used to sort messages that are at first sight considered to be of no pertinence or importance.

However, in many cases the pertinence of the messages received changes in the sense that the messages may be important for a certain, variable duration or period of time, but become obsolete later on.

Some electronic message clients take this notion of message obsolescence into account and suggest automatic archiving tools to the user for the messages that arrive at the inbox of an electronic message client. With these tools, the user can create a specific location to which all messages in the inbox of the electronic message client received before a certain date will automatically be moved. It is therefore not possible with these tools to archive each message in a folder that is specifically adapted to the content or subject of the message.

Furthermore, the importance and obsolescence criteria are not generally dependent only on the date when the message is received. More specifically, some messages may be considered to be important by the user for as long as certain tasks generated by the content of the message have not been carried out.

Thus, upon receiving and reading the message, the user may decide, by way of example and not of limitation, that it may be necessary to contact someone by electronic message, by phone, or by fax, or else to edit a file managed within the communication system, or, alternatively, to plan a meeting.

Users receiving this type of message do not generally act directly upon receiving and reading the message. The user must therefore remember the task he or she must carry out, while new messages keep on arriving. On the other hand, once the task has been carried out, the message having created the need to carry out this task will be lost in the volume of messages received on the electronic message client between the first time it was read by the user and the time when the task is carried out. If the user does not wish a cumbersome accumulation of messages in his/her inbox, he/she will need to once again find the message concerning the task among the messages in his/her inbox, and carry out a manual archiving operation. This task is not only inconvenient, but also an extreme waste of time for the user.

The present invention aims at improving management of a user's electronic messages enabling a message in an electronic message client inbox to be archived at an appropriate time at a location that is best adapted to the content of the message.

The present invention is based on the fact that most tasks that may be triggered by the content of an electronic message may be accomplished by using parts of the communication system to which the electronic message client belongs.

Thus, a first goal of the invention concerns a management method applying to electronic messages in an inbox associated to a user of an electronic message client integrated in a communication system characterised in that, for each of the said electronic messages, the user may, from within the electronic message client, assign an archiving rule consisting in the definition, on the one hand, of at least one action out of a list of actions whose implementation is susceptible of being detected by the said communication system, and, on the other hand, of information concerning a location within the said communication system to which the said message is to be moved when the said action is carried out, and in that the said message is in fact moved to the said location upon detection of the said communication system of performance of the action.

A second goal of the invention concerns a communication system comprising an electronic message client to manage electronic message messages in an inbox associated to a user of the said electronic message client, characterised in that the said electronic message client comprises means to enable the user to assign, for each of the said electronic messages, an archiving rule consisting in the definition, on the one hand, of at least one action from among a list of actions whose implementation is susceptible of being detected by the said communication system, and, on the other hand, of information relating to a location within the said communication system to which the said message is to be moved when the said action is carried out, and in that the communication system comprises, in addition, means of detection to detect that the action attached to the said message has been carried out, and means of generating an archiving command to move the said message to the said location upon detection of the fact that the action has been performed.

Other characteristics and advantages of the invention will become apparent in the description that follows in reference to the single FIGURE attached.

The single FIGURE schematically represents a preferred architecture of a communication system particularly adapted to a company network.

As shown in the FIGURE, the communication system 1 comprises an electronic message client 2 capable of managing electronic messages from multiple users of the communication system 1. Below we shall explain the handling of electronic messages in the inbox of a user 3 in particular, the other users of the communication system 1 being represented in the FIGURE by the reference 31.

Furthermore, as the communication system 1 is incorporated into a company network, it generally comprises different communication means such as, in particular:

one or more electronic message servers 101 enabling users 3, 31 to send or receive electronic messages;

one or more networked printers constituting a printing system 102 enabling the users 3, 31 to print a document;

one or more fax machines constituting a system of fax machines 103 enabling users 3, 31 to send or receive faxes;

one or more telephones constituting a telephony system of 104 enabling users 3, 31 to carry out telephone communications;

The communication system 1 may also comprise:

a file manager 105 enabling users 3, 31, in particular, to edit, move or delete files;

a network connection manager 106, also called proxy system and enabling, among other things, users to navigate to Internet or Intranet sites and to complete FTP uploads or downloads.

The communication system 1 may also comprise collaborative application management means such as, in particular:

databases 107, 108, 109 enabling recording of data related to Wiki pages, collaborative FAQs, or blogs, whether or not hosted by the communication system 1;

a database 110, enabling storing of data related to RSS flows emitted by collaborative applications, whether or not hosted by the communication system 1;

databases 111, 112 enabling, among other things, storage of task information or planning information shared by different users 3, 31.

As the communication system 1 is shared by several users, it generally comprises user rights management means 113 of the said communication system 1 that makes it possible to associate to each user 3, 31 of the communication system 1 different characteristics such as connection rights or rights to the use of available programmes or systems within the communication system 1.

The entire set of components mentioned above is regularly controlled by agents 114*a*, 114*b*, 114*c*, 114*d* that principally control their operation, their presence and the different modifications they are subjected to.

The communication system comprises, among other things, a set of interfaces 4, 4*b*, 4*c*, 4*d* called, respectively, communication interface, system interface, collaborative interface and management interface, enabling, on the one hand, a system user 3, 31 to access the different elements described above in order to enable him/her to use them, and enabling, on the other hand, the communication system 1 to interface with elements that are external to the communication system 1.

As mentioned earlier, the different tasks induced by the content of an electronic message received by a specific user 3 of the electronic message client 2 are generally carried out by means of one of the numerous elements of the communication system 1.

Based on this fact, the present invention proposes enabling user 3 to define, for each message in his/her inbox, an archiving rule according to which he/she may define at least one action among a list of actions whose implementation may be detected by the communication system, and a destination location to which the message will actually be moved upon detection of the implementation of the action.

When the user 3 wishes to read his/her messages, he/she launches the electronic message client 2. A viewing interface (not represented) of the electronic message client 2 then allows the user to show all messages stored either in a database 215 that is internal to the electronic message client 2, or in a database 115 that is external to the electronic message client 2. Messages are generally organised by folder, and new messages, loaded by the electronic message client 2 from an electronic message server that is internal or external to the communication system 1, appear in the folder generally referred to as the inbox.

The electronic message client 2 enables the user, among other things, to select a message from the inbox to be transferred, read or moved to another folder of the electronic message client. In accordance with the invention, the electronic message client 3 also makes it possible to assign to such selected message an archiving rule consisting of action and location information.

More precisely, when the user selects a message in his/her inbox, the electronic message client 2 can suggest assignment of an archiving rule in accordance with the invention. This suggestion can materialise, in particular, in the form of a dropdown menu appearing as soon as the message has been selected from the list of messages in the inbox or, more appropriately, by means of a tab that appears when the message is shown by the display interface of the electronic message client 2.

When the archiving function is activated by the user 3, the electronic message client 2 opens an interaction window or a dialogue box enabling the user 3 to enter an action as well as information relating to a location 115, 215. Preferably, a first list of default actions and second list of default location data can be associated to the interaction window or dialogue box. The user can then create his/her archiving rule by himself/herself entering at least one action and one location information or by selecting at least one action and one location information from among the lists suggested by the electronic message client 2.

As has been previously indicated, the actions are to be selected from among a list of actions whose implementation may be detected by the communication system.

Thus, the action may have been carried out by using any of the communication means 101, . . . , 104. In that case, the action of the archiving rule can, more particularly, be one of the following actions:

sending or receiving of an electronic message by a user 3, 31 of the said communication system 1 by means of the said electronic message servers 101;

printing of a document by a user 3, 31 of the said communication system 1 by means of one of the printers of the said printing system 102;

sending or receiving of a fax by a user 3, 31 of the said communication system 1 by means of one of the fax devices of the said fax sending/receiving system 103;

or placing or receiving of a telephone call by a user 3, 31 of the said communication system 1 by means of the said telephony system 104;

In variation or combination, the action may have been carried out by using the file manager 115. In that case, the following can be added to the list of actions:

using or updating a file present in the communication system 1 by a user 3, 31 of the said communication system 1;

moving a file from a first location to a second location of the communication system 1 by a user 3, 31 of the said communication system 1;

exceeding a storage limit of a file storage module of the communication system 1.

In variation or combination, the action may have been carried out by using the network connection file manager 116. In that case, the following can be added to the list of actions:

access to a web page from the said communication system 1 by a user 3, 31 of the said communication system 1;

access to an Intranet page hosted by the said communication system 1 by a user 3, 31 of the said communication system 1;

implementation of an FTP transfer by any user 3, 31 of the said communication system 1.

In variation or combination, the action may have been carried out by using the collaborative application management means 107, . . . 112, whether or not hosted by the communication system 1. In that case, the following can be added to the list of actions:

update of a page of a collaborative application by a user 3, 31 of the communication system 1 in the case of a collaborative application hosted by the said communication system 1;

update of a page of a collaborative application hosted outside the communication system 1.

In variation or combination, the action may have been carried out by using the use rights management means 113 of the communication system 1. In that case, the following can be added to the list of actions:

modification of the user rights database by a user 3, 31 of the said communication system 1.

As the communication system 1 can be used by several users 31 other than user 3 having assigned an archiving rule to one of the messages present in their inbox, it is of interest that user 3, wishing to archive his/her message should be able to specify whether he/she wishes to carry out the action himself/ herself or whether the action can be carried out by another user 31 of the communication system 1. Preferably, the archiving rule is among other things a function of the user who must carry out the said action in the communication system 1. The user who must carry out the action is chosen from among user 3, to whom the inbox is associated, and other users 31 of the said communication system 1. Such specification makes it possible to avoid situations such as in particular the archiving of a message during printing or editing of a document by a colleague 31 of the user 3 having defined the archiving rule while the latter wanted actually to trigger archiving only after having carried out the action himself or herself.

Advantageously, the said list of actions is a function of a profile set up for the user 3, 31 who is to carry out the action, the said profile defining the rights of use of the programmes or systems available on the communication system (1). This preferred embodiment is intended to prevent a user 3 from associating, when creating the archiving rule, an action to be carried out by a user 3, 31 of the communication system 1 who does not possess the system rights to carry out such action from within the communication system 1. As it would then not be possible to carry out the action, it would never be detected and therefore the message would never be archived.

Once the archiving rule is entered, it is attached to the message. This stage may, among others, be carried out by the event management module 217 of the electronic message client 2. Advantageously, the event management module 217 equally adds a visual information to the message so that the user 3, when viewing the list of the messages in his/her inbox from the viewing interface of the electronic message client 2, can easily identify a message to which an archiving rule has been attached.

Periodically or when the electronic message client 2 is closed by the user 3, the archiving rule is transmitted to the communication system 1 to be stored in a database 116.

The message will be moved when the action contained in the archiving rule is detected by the communication system 1.

Detection of the performance of an action is rendered possible by using different agents 114a to 114d as mentioned above that control the different means of the communication system.

More precisely, when the action attached to the message is an action carried out by one of the communication means 101, . . . , 104, the communication agents 114a dedicated in particular to the control of the said communication means are, in accordance with the invention, also used to analyse the use of such means. Regular analysis by such agents 114a enables detection of the events effected on such means. The events thus detected are transmitted to an event management module 117, 118 of the communication system whose operation will be described at a later stage.

If the action attached to the message is connected to the use of the file manager 115 or network connection manager 116, the communication system 1 may, in order to detect the implementation of the action, use agents 114b, called file agents and system agents, dedicated, in particular and respectively, to tracking each use or modification of a file stored in the communication system and network access control.

Thus, when a user 3, 31 of the communication system 1 modifies a version of a file or uses network access options, the agents 114b detect such events and transmit them to the event management module 117, 118 of the communication system 1.

The archiving rule action may also be an action related to the use of use right management means 113 for the communication system 1. In that case, the communication system 1 may, in order to detect the implementation of the action, use agents 114d that control the information of database 113 dedicated to the management of the users 3, 31. The modifications of data on the user management database 113 such as in particular a change in an identifier, a connection password or user rights attached to a user 3, 31 on the said database will be detected and transmitted to the events management module 117, 118 of the communication system 1.

Similarly, if the action attached to the message relates to the use of the collaborative application management means 107, . . . , 112, whether or not hosted by the communication system 1, each data modification in one of the databases comprising information related to collaborative applications is detected by one of the pertinent collaborative agents 114c.

For example, when a user makes a change on a Wiki page or on a blog, or contributes to a collaborative FAQ, the data stored in the databases 107, 108, 109 containing the information necessary for those pages are modified accordingly. Similarly, when the communication system is suitable for receiving and analysing RSS flows from the Internet or Intranet site, the data in the RSS flow management database 110 are similarly modified. As each modification corresponds to an update of a collaborative application, an information message concerning such event is then transmitted by the agent 114c to the event management module 117, 118 of the communication system 1.

In the examples of detection of implementation of an action described heretofore, the implementation of the action had taken place within the communication system. However, it is possible, in particular in cases where the action consists in the update of a page of a collaborative application hosted outside the communication system, that implementation takes place outside of the communication system 1. In such cases, some of the collaborative agents 114c may be set so as to periodically check changes on external sites hosting collaborative applications and thus to detect the update of such applications even if they are not hosted by the communication system 1. Such agents 114c may also be used to scrutinise data exchanged between the communication system 1 and external systems linked to the said communication system 1. The analysis of exchanged data can enable detection of the performance of an action external to the communication system 1.

Once the events are transmitted by the different agents 114a, . . . , 114d of the event management module 117, 118, the latter determines whether an action received corresponds to an action of one of the archiving rules stored in the database 116. Such determination may take place by means of an event agent 118 of the event management module 117, 118 that compares the actions transmitted to the event management module 117, 118 to the actions of the archiving rules stored in the database 116.

When it is determined that an action that has been implemented coincides with an action of an archiving rule previously attached to a message by the user 3, the event management module 117, 118 generates an archiving command for the message associated to the archiving rule whose action was carried out. The command is generated taking into account the information concerning the location associated to the message.

When several actions were entered by the user 3 when creating the archiving rule, it is necessary that all such actions should have been carried out. As these actions are not necessarily carried out at the same time, the event management module 117, 118 is able to check whether any other actions are comprised in the archiving rule. In that case, the event management module 117, 118 is also capable of determining if the other actions have already been carried out, or whether on the contrary they have not yet been implemented.

Thus, the event management module 117, 118, generates an archiving command only once all actions comprised in the archiving rule have been carried out.

The archiving command is then sent to the electronic message client 2 event management module 217 which can, upon reception of a command of this type, update the message storage database 115, 215 so that the message will be moved to the location 115, 215 indicated in the command, where the location may correspond to a location 115 that is external to the electronic message client or to a location 215 that is internal to the electronic message client 2.

When the message marked for moving is, on the one hand, already stored in an external database 115, and, on the other hand, the location indicated in the archiving command is a location 115 that is external to the electronic message client, the event management module 117, 118 of the communication system 1 can update the external database 115 without requiring transmission of the archiving command to the event electronic message client internal management module 217.

In the message viewing interface of the electronic message client 2, archiving of the message is translated into removal of the message from the list of messages in the inbox and its listing in a folder related to the message's new location.

Advantageously, a distinctive mark is added to the moved message by the event management module 217 of the electronic message client 2. This mark then enables the user 3 not only to realise that automatic archiving has taken place, but also to understand the reason for the presence of the message in a particular folder.

In a preferred embodiment of the invention, the user 3, having previously attached an action to one of his/her received messages, may, for as long as the action has not been carried out, detach or modify the action from within the electronic message client 2.

Although the different characteristics and advantages of the invention have been described by reference to a communication system 1 integrated in a company network, the invention is not limited to this type of communication system. The invention may also be implemented in a much simpler communication system comprising a single personal computer connected to a printer and/or a fax, and/or a telephone, and/or having an Internet connection.

The invention claimed is:

1. A method of managing electronic messages to a user of an electronic message client, comprising:
    using an electronic message client in conjunction with one or more electronic message of a plurality of electronic messages in an inbox associated with a user, the electronic message client integrated in a communication system, the using comprising:
    selecting an electronic message from the inbox;
    assigning an archiving rule to the selected electronic message that includes a definition of an action that can be subsequently carried out using at least some portion of the communication system, wherein the action defined in the archiving rule is selected from a list of actions that can be detected by the communication system, wherein the action defined in the archiving rule is based at least in part on content of the selected electronic message; and
    defining an archive location within the communication system to which the selected electronic message is moved after the action is detected; and
    moving the selected electronic message from the inbox to the archive location after detection of the action defined in the archiving rule;
    wherein the communication system provides management of collaborative applications, the list of actions comprising at least one of the following actions:
    update to a page associated with a collaborative application by the user or another user associated with the communication system in which the collaborative application is hosted by the communication system; and
    update to a page associated with a collaborative application in which the collaborative application is hosted outside the communication system.

2. The method according to claim 1 wherein the communication system comprises at least one of an electronic message server, a printing system, a fax sending/receiving system and a telephony system, the list of actions comprising at least one of the following actions:
    sending or receiving a message to or from the user or another user associated with the communication system in conjunction with the electronic message server;
    printing a document from the user or another user associated with the communication system in conjunction with the printing system;
    sending or receiving a fax to or from the user or another user associated with the communication system in conjunction with the fax sending/receiving system; and
    placing or receiving a telephone call to or from the user or another user associated with the communication system in conjunction with the telephony system.

3. The method according to claim 1 wherein the communication system comprises a file manager, the list of actions comprising at least one of the following actions:
    using or updating a file present in the communication system by the user or another user associated with the communication system;
    moving a file from a first location to a second location of the communication system by the user or another user associated with the communication system; and exceeding a storage limit of a file storage module of the communication system.

4. The method according to claim 1 wherein the communication system comprises a network connection manager, the list of actions comprising at least one of the following actions:
   access to a web page from the communication system by the user or another user associated with the communication system;
   access to an Intranet page hosted by the communication system by the user or another user of the communication system; and
   implementation of an FTP transfer by the user or another user associated with the communication system.

5. The method according to claim 1 wherein the communication system comprises a user rights database for management of user rights in conjunction with the communication system, the list of actions comprising:
   modification of the user rights database by the user or another user associated with the communication system.

6. The method according to claim 1 wherein the archiving rule is a function of the user or another user associated with the communication system who is to carry out the action within the communication system.

7. The method according to claim 6 wherein the list of actions is a function of a profile set up for the user or the another user who is to carry out the action, the profile defining rights for use of programs and systems associated with the communication system.

8. The method according to claim 1, further comprising:
   after the selected electronic message is moved to the archive location, adding a distinctive mark to the selected electronic message enabling the selected electronic message to be differentiated from other electronic messages.

9. Communication system, comprising
   an electronic message client configured to enable a user to use the electronic message client to manage one or more electronic message of a plurality of electronic messages in an inbox associated with the user, the plurality of electronic messages stored in a message storage database, the electronic message client comprising:
      a client management processor configured to enable the user to select an electronic message from the inbox, assign an archiving rule to the selected electronic message that includes a definition of an action that can be subsequently carried out using at least some portion of the communication system, wherein the action defined in the archiving rule is selected by the user from a list of actions that can be detected by the communication system, wherein the action defined in the archiving rule is based at least in part on content of the selected electronic message, and define an archive location within the communication system to which the selected electronic message is moved after the action is detected, and
   the communication system further comprising:
      a detection processor configured to detect the action defined in the archiving rule assigned to the selected electronic message was carried out,
      an event management processor configured to generate an archiving command to move the selected electronic message from the inbox to the archive location after detection of the action defined in the archiving rule; and
      a collaborative application management processor configured to manage collaborative applications;
   wherein the list of actions includes at least one of the following actions:
      update to a page associated with a collaborative application by the user or another user associated with the communication system in which the collaborative application is hosted by the communication system; and
      update to a page associated with a collaborative application in which the collaborative application is hosted outside the communication system.

10. The communication system according to claim 9, further comprising:
   at least one of an electronic message server, a printing system, a fax sending/receiving system and a telephony system;
   wherein the list of actions include at least one of the following actions:
      sending or receiving a message to or from the user or another user associated with the communication system in conjunction with the electronic message server;
      printing a document from the user or another user associated with the communication system in conjunction with the printing system;
      sending or receiving a fax to or from the user or another user associated with the communication system in conjunction with the fax sending/receiving system; and
      placing or receiving a telephone call to or from the user or another user associated with the communication system in conjunction with the telephony system.

11. The communication system according to claim 9, further comprising:
   a file manager;
   wherein the list of actions includes at least one of the following actions:
      using or updating a file present in the communication system by the user or another user associated with the communication system;
      moving a file from a first location to a second location of the communication system by the user or another user associated with the communication system; and
      exceeding a storage limit of a file storage module of the communication system.

12. The communication system according to claim 9, further comprising:
   a network connection manager;
   wherein the list of actions includes at least one of the following actions:
      access to a web page from the communication system by the user or another user associated with the communication system;
      access to an Intranet page hosted by the communication system by the user or another user associated with the communication system; and
      implementation of an FTP transfer by the user or another user associated with the communication system.

13. The communication system according to claim 9, further comprising:
   a user rights database for management of user rights in conjunction with the communication system;
   wherein the list of actions includes modification of the user rights database by the user or another user associated with the communication system.

14. The communication system according to claim 9 wherein the archiving rule is a function of the user or another user associated with the communication system who is to carry out the action within the communication system.

15. The communication system according to claim 14 wherein the list of actions is a function of a profile set up for the user or the another user who is to carry out the action, the profile defining rights for use of programs and systems associated with the communication system.

16. The communication system according to claim 9 wherein, after the selected electronic message is moved to the archive location, a distinctive mark is added to the selected electronic message enabling the selected electronic message to be differentiated from other electronic messages.

17. A method of managing electronic messages via an electronic message client, comprising:
   selecting a first electronic message from an inbox of an electronic mail client associated with a user and integrated in a communication system;
   assigning a first archiving rule to the first electronic message using the electronic mail client, the first archiving rule specifying a first action selected from a plurality of actions that can be detected by the communication system and a first storage location within the communication system to which the first electronic message is to be archived, wherein the first action specified in the first archiving rule is selected from the plurality of actions based at least in part on content of the first electronic message;
   detecting the first action specified in the first archiving rule after the first action was carried out using at least some portion of the communication system; and
   moving the first electronic message from the inbox of the electronic mail client associated with the user to the first storage location associated with the first archiving rule after the first action specified in the first archiving rule was detected;
   wherein the communication system provides management of collaborative applications, the plurality of actions comprising at least one of the following actions:
      update to a page associated with a collaborative application by the user or another user associated with the communication system in which the collaborative application is hosted by the communication system; and
      update to a page associated with a collaborative application in which the collaborative application is hosted outside the communication system.

18. The method according to claim 17, further comprising:
   selecting a second electronic message from the inbox of the electronic mail client associated with the user;
   assigning a second archiving rule to the second electronic message using the electronic mail client, the second archiving rule specifying a second action selected from the plurality of actions that can be detected by the communication system and a second storage location within the communication system to which the second electronic message is to be archived, wherein the second action specified in the second archiving rule is selected from the plurality of actions based at least in part on content of the second electronic message;
   detecting the second action specified in the second archiving rule after the second action was carried out using at least some portion of the communication system; and
   moving the second electronic message from the inbox of the electronic message client associated with the user to the second storage location associated with the second archiving rule after the second action specified in the second archiving rule was detected.

19. The method according to claim 17, further comprising:
   assigning a second archiving rule to the first electronic message using the electronic mail client, the second archiving rule specifying a second action selected from the plurality of actions that can be detected by the communication system and the first storage location within the communication system to which the first electronic message is to be archived, wherein the second action specified in the second archiving rule is selected from the plurality of actions based at least in part on content of the first electronic message;
   detecting the second action specified in the second archiving rule after the second action was carried out using at least some portion of the communication system; and
   moving the first electronic message from the inbox of the electronic message client associated with the user to the first storage location associated with the second archiving rule after the second action specified in the second archiving rule was detected.

20. The method according to claim 17 wherein the first archiving rule also specifies a second action selected from the plurality of actions that can be detected by the communication system, wherein the second action specified in the second archiving rule is selected from the plurality of actions based at least in part on content of the first electronic message, the method further comprising:
   detecting the second action specified in the second archiving rule after the second action was carried out using at least some portion of the communication system; and
   moving the first electronic message from the inbox of the electronic message client associated with the user to the first storage location associated with the first archiving rule after the second action specified in the first archiving rule was detected.

* * * * *